(12) United States Patent
Kamata et al.

(10) Patent No.: US 8,801,291 B2
(45) Date of Patent: Aug. 12, 2014

(54) SUPPORT MEMBER

(75) Inventors: Koji Kamata, Sagae (JP); Yugo Takano, Sagae (JP)

(73) Assignees: TPR Co., Ltd., Chiyoda-ku, Tokyo (JP); TPR Industry Co., Sagae-shi, Yamagata (JP)

( * ) Notice: Subject to any disclaimer, the term of this patent is extended or adjusted under 35 U.S.C. 154(b) by 0 days.

(21) Appl. No.: 13/409,917

(22) Filed: Mar. 1, 2012

(65) Prior Publication Data

US 2012/0224798 A1 Sep. 6, 2012

(30) Foreign Application Priority Data

Mar. 3, 2011 (JP) ................................. 2011-046192

(51) Int. Cl.
*F16C 33/02* (2006.01)

(52) U.S. Cl.
USPC .......................................................... 384/276

(58) Field of Classification Search
USPC ......... 384/276, 277, 280, 281, 282, 297, 912; 29/898.059
See application file for complete search history.

(56) References Cited

U.S. PATENT DOCUMENTS

| | | | | |
|---|---|---|---|---|
| 1,331,961 | A | * | 2/1920 | Klocke .......................... 384/276 |
| 1,480,571 | A | | 1/1924 | Selker |
| 3,084,003 | A | * | 4/1963 | Matt et al. ...................... 384/278 |
| 3,449,032 | A | * | 6/1969 | Scheufler ....................... 384/278 |
| 5,286,014 | A | * | 2/1994 | Chakko .......................... 267/293 |
| 5,634,726 | A | | 6/1997 | Edele et al. |
| 6,076,494 | A | | 6/2000 | Kampichler et al. |
| 6,267,508 | B1 | * | 7/2001 | Bank et al. ..................... 384/276 |
| 7,757,403 | B1 | | 7/2010 | Lee et al. |

FOREIGN PATENT DOCUMENTS

| | | |
|---|---|---|
| GB | 172719 | 9/1920 |
| GB | 764135 | 12/1956 |
| GB | 2 248 669 | 4/1992 |
| JP | 04275137 A * | 9/1992 |
| JP | 10-131975 | 5/1998 |
| JP | 2000-505858 | 5/2000 |
| JP | 2002-372030 | 12/2002 |
| JP | 2003-326353 | 11/2003 |
| JP | 2008-057568 | 3/2008 |
| WO | WO 98/16413 | 4/1998 |

OTHER PUBLICATIONS

Extended European Search Report for European Application No. 12154834.1 mailed May 4, 2012.
Japanese Office Action from corresponding application No. 2011-046192 mailed Mar. 19, 2013.
Japanese Office Action for corresponding application No. 2011-046192 mailed Oct. 22, 2013.

\* cited by examiner

*Primary Examiner* — Phillip A Johnson
(74) *Attorney, Agent, or Firm* — Merchant & Gould P.C.

(57) ABSTRACT

A support member with excellent contact with the member to which the support member is attached, that is, a metal support member which supports a shaft directly or through a bearing and which has a plurality of the projections at its outer circumferential surface, wherein the plurality of the projections are formed at the outer circumferential surface as a whole at the time of casting of the support member and wherein at least part of the projections have thin-waisted shapes or a plastic support member which supports a shaft directly or through a bearing and which has a plurality of the projections at its outer circumferential surface, wherein the plurality of the projections are formed at the outer circumferential surface as a whole at the time of molding of the support member and wherein at least part of the projections have thin-waisted shapes.

5 Claims, 6 Drawing Sheets

SUPPORT MEMBER

This application claims benefit of Serial No. 2011-046192, filed 3 Mar. 2011 in Japan and which application is incorporated herein by reference. To the extent appropriate, a claim of priority is made of the above disclosed application.

BACKGROUND OF THE INVENTION

1. Field of the Invention

The present invention relates to a support member which supports a rotary member directly or through a bearing.

2. Description of the Related Art

As a support member which supports a rotary member, for example the wear-preventing sleeve shown in Japanese Patent Publication (A) No. 10-131975 is known. This sleeve is attached by insert casting to a cast member provided with a support hole for supporting a rotary member and supports the rotary member in a sliding manner to prevent wear of the support hole. The sleeve is formed with several projecting parts at intervals in the outer circumferential surfaces so as to prevent it from being pulled out from the support hole of the cast member or prevent it from turning inside it (see FIG. 7 of Japanese Patent Publication (A) No. 10-131975)

As related art, see Japanese Patent Publication (A) No. 10-131975.

However, with the wear-preventing sleeve shown in Japanese Patent Publication (A) No. 10-131975, sometimes contact with the cast member is insufficient.

SUMMARY OF INVENTION

An object of the present invention is to provide a support member with excellent contact with the member to which the support member is attached.

The present invention provides a metal support member which supports a rotary member directly or through a bearing and which has a plurality of the projections at its outer circumferential surface, wherein the plurality of the projections are formed at the outer circumferential surface as a whole at the time of casting of the support member and wherein at least part of the projections have thin-waisted shapes.

The height of the projections is preferably 0.3 to 2.0 mm, while the number of the projections is preferably 5 to 100/cm$^2$.

The metal support member is preferably made of cast iron, cast steel, copper, copper alloy, aluminum, aluminum alloy, magnesium, or magnesium alloy.

The metal support member is a tubular member or split member. The tubular member is comprised of an integrally formed member or a pair of divided split members.

The metal support member is preferably produced by centrifugal casting.

The metal support member is, for example, attached by being insert cast in a member made of aluminum, aluminum alloy, magnesium, or magnesium alloy. Alternatively, the metal support member is attached by integral molding in a member made of plastic or rubber.

The present invention is not limited to the above metal support member and may also be a plastic support member. That is, the invention also provides a plastic support member which supports a rotary member directly or through a bearing and which has a plurality of the projections at its outer circumferential surface, wherein the plurality of the projections are formed at the outer circumferential surface as a whole at the time of molding of the support member and wherein at least part of the projections have thin-waisted shapes.

The height of the projections is preferably 0.3 to 2.0 mm, and the number of the projections is preferably 5 to 100/cm$^2$.

The plastic support member is a tubular member or split member. The tubular member is comprised of an integrally molded member or a pair of divided split members.

The plastic support member is preferably made by injection molding.

The plastic support member is for example attached by integral molding in a member made of a plastic or rubber.

According to the support member of the present invention, the contact with the member to which the support member is attached is improved and the member is prevented from being pulled out or turning. Further, it is possible to make the support member and the member to which the support member is attached thinner.

BRIEF DESCRIPTION OF DRAWINGS

These and other objects and features of the present invention will become clearer from the following description of the preferred embodiments given with reference to the attached drawings, wherein:

FIGS. 1A and 1B show an embodiment of the present invention, wherein FIG. 1A is a longitudinal cross-sectional view along a shaft showing a support member which is attached to an outside member and which directly supports a shaft and FIG. 1B is an enlarged cross-sectional view showing a joined part of the outside member and support member;

FIGS. 3A and 3B show another embodiment of the present invention, wherein FIG. 3A is a longitudinal cross-sectional view cut along the shaft showing a support member which is attached to an outside member and which directly supports a shaft and FIG. 3B is an enlarged cross-sectional view showing a joined part of the outside member and support member;

FIGS. 5A and 5B show still another embodiment of the present invention, wherein FIG. 5A is a longitudinal cross-sectional view cut along a shaft showing a support member which is attached to an outside member and supports a shaft through a bearing and FIG. 5B is an enlarged cross-sectional view showing a joined part of an outside member and support member;

FIGS. 7A and 7B show still another embodiment of the present invention, wherein FIG. 7A is a longitudinal cross-sectional view cut along a shaft showing a support member which is attached to an outside member and supports a shaft through a bearing and FIG. 7B is an enlarged cross-sectional view showing a joined part of an outside member and support member;

FIGS. 9A and 9B show still another embodiment of the present invention, wherein FIG. 9A is a longitudinal cross-sectional view cut along a shaft showing a support member which is attached to an outside member and supports a shaft directly and FIG. 9B is an enlarged cross-sectional view showing a joined part of an outside member and support member;

FIGS. 11A and 11B show still another embodiment of the present invention, wherein FIG. 11A is a longitudinal cross-sectional view cut along a shaft showing a support member which is attached to an outside member and supports a shaft through a bearing and FIG. 11B is an enlarged cross-sectional view showing a joined part of an outside member and support member.

DESCRIPTION OF PREFERRED EMBODIMENTS

Below, preferred embodiments of the present invention will be explained while referring to the figures.

Figure 1A:
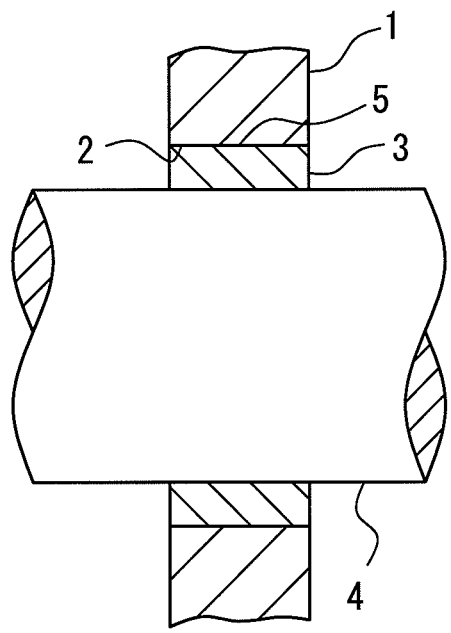
Figure 1B:
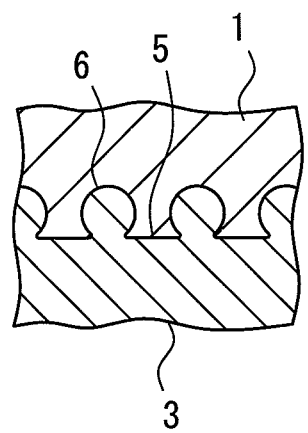
Figure 2:
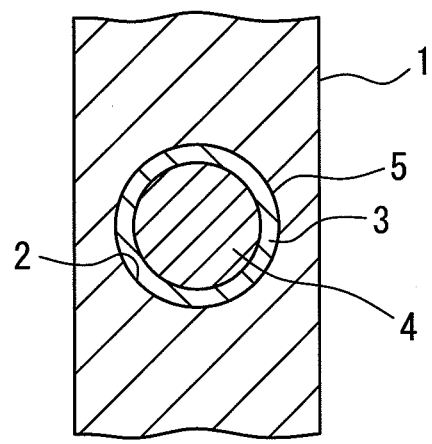
FIG. 2 is a longitudinal cross-sectional view of the support member part of FIG. 1A cut perpendicular to the shaft.

FIGS. 1A and 1B and FIG. 2 show an example where a support member directly supports a shaft. A metal outside member 1 is formed with a support hole 2. Inside this support hole 2, a metal support member comprised of a cylindrical tubular member 3 is attached. Inside the tubular member 3, a shaft 4 is supported in a rotatable manner.

The outside member 1 is made of aluminum, aluminum alloy, magnesium, or magnesium alloy. The tubular member 3 is attached to the support hole 2 of the outside member 1 by insert casting. The metal tubular member 3 is formed by cast iron, cast steel, copper, copper alloy, aluminum, aluminum alloy, magnesium, or magnesium alloy.

At the outer circumferential surface 5 of the tubular member 3, a plurality of projections 6 are formed over the entire area. Among the projections 6, part or all of the projections 6 are thin-waisted. The height of the projections 6 is 0.3 to 2.0 mm, while the number of the projections 6 is 5 to 100/cm$^2$.

If the height of the projections 6 is less than 0.3 mm, the contact becomes insufficient, while if larger than 2.0 mm, the height of the projections 6 easily becomes uneven and the precision of the outside diameter falls. If the number of the projections 6 is less than 5/cm$^2$, the contact becomes insufficient, while if larger than 100/cm$^2$, the clearance between the projections 6 becomes smaller, so when the tubular member 3 is attached inside the metal outside member 1 by insert casting or is attached inside a plastic or rubber member by integral molding, the metal, plastic, or rubber will no longer sufficiently fill the clearances between the projections 6 and contact will easily become insufficient.

The tubular member 3 is produced by centrifugal casting. Below, the method of production of the tubular member 3 will be explained.

Diatomaceous earth, bentonite (binder), water, and a surfactant are mixed in a predetermined ratio to prepare a mold wash. The mold wash is spray coated on the inside surface of a casting mold (mold) which is heated to 200 to 400° C. and rotates whereby a mold wash layer is formed on the inside surface of the casting mold. Due to the action of the surfactant, a plurality of recessed holes are formed in the mold wash layer due to the bubbles of the gas produced from the inside of the mold wash layer. The mold wash layer is dried, then metal melt is cast into the rotating casting mold. At this time, the melt fills the recessed holes of the mold wash layer whereby a plurality of uniform projections are formed. The melt hardens to form the tubular member, then the tubular member is taken out from the casting mold together with the mold wash layer. This is then blasted to remove the mold wash whereby a tubular member which has a plurality of projections, at least part of which projections have a thin-waisted shape, over its entire outer circumferential surface is produced.

Figure 3A:
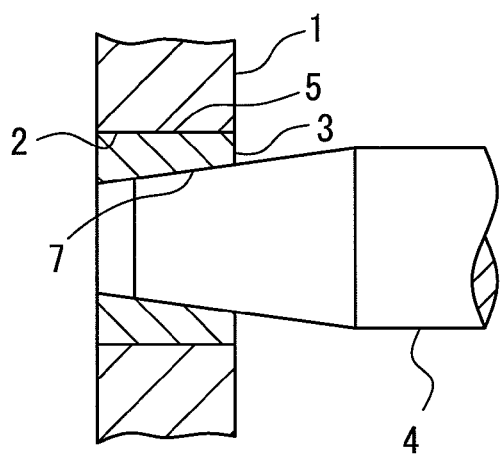
Figure 3B:
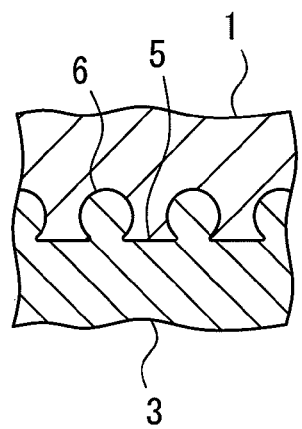
Figure 4:
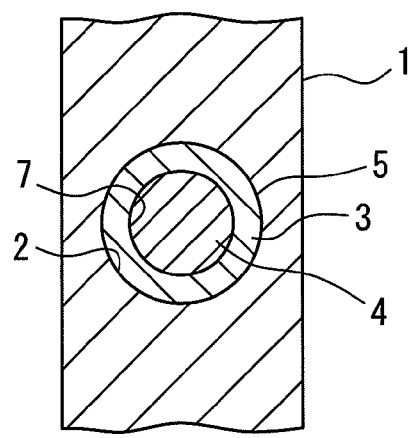
FIG. 4 is a longitudinal cross-sectional view of the support member part of FIG. 3A cut perpendicular to the shaft.

FIGS. 3A and 3B and FIG. 4 show another embodiment of the present invention. The present embodiment differs from the above embodiment in the point that the support hole of the support member and the end of the shaft are formed tapered.

That is, in the present embodiment, the support hole 7 which supports the shaft 4 of the tubular member 3 is formed tapered, while the end of the shaft 4 which is inserted into this support hole 7 is formed tapered. The rest of the configuration is the same as the above embodiment.

Figure 5A:
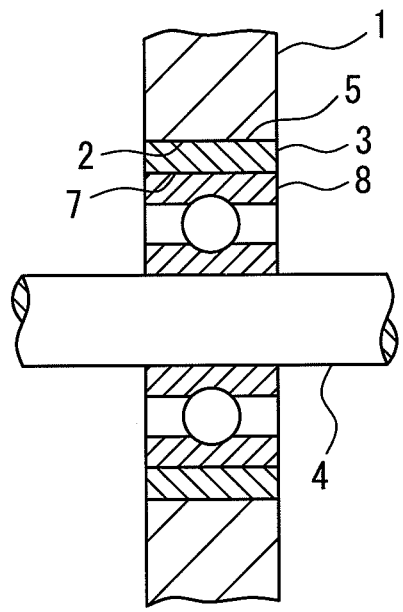
Figure 5B:
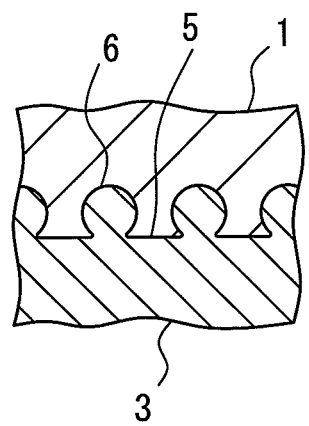
Figure 6:
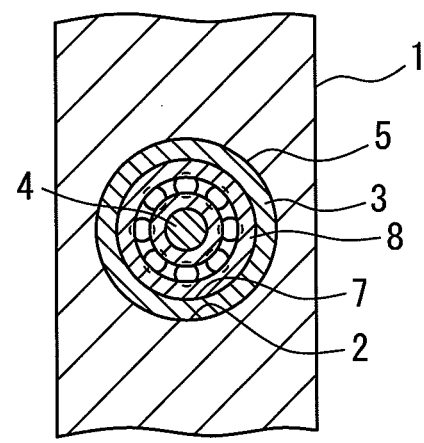
FIG. 6 is a longitudinal cross-sectional view of the support member part of FIG. 5A cut perpendicular to the shaft.

FIGS. 5A and 5B and FIG. 6 show still another embodiment of the present invention. The present embodiment shows an example where the support member supports a shaft through a bearing. It differs from the first embodiment in the point that the shaft is supported by the support member through a bearing.

That is, in the present embodiment, inside of the support hole 2 of the outside member 1, a tubular member 3 is attached. The shaft 4 is supported rotatably in the support hole 7 of the tubular member 3 through a bearing 8. The rest of the configuration is the same as the above embodiments.

Figure 7A:
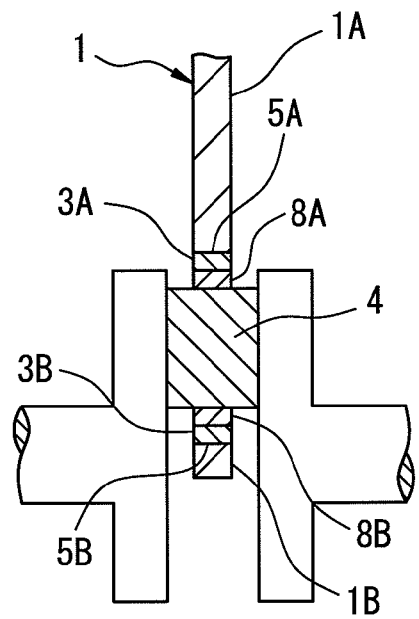
Figure 7B:
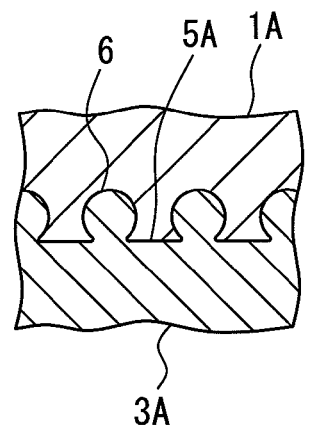
Figure 8:
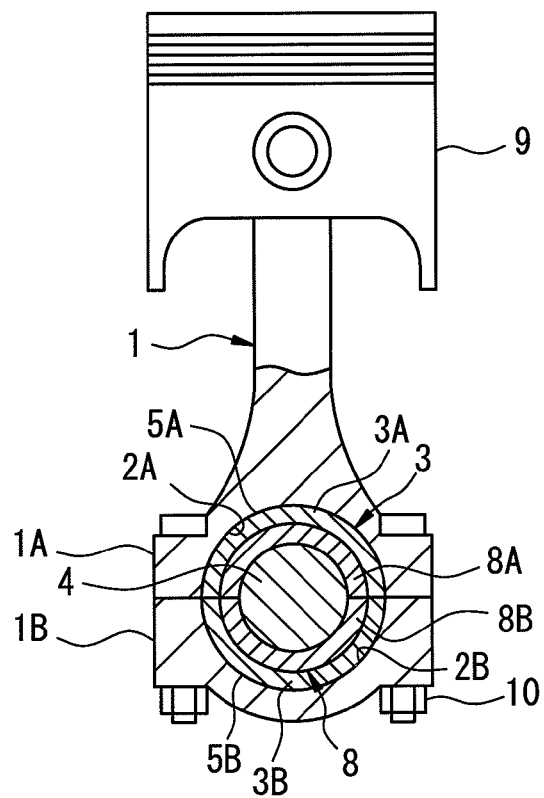
FIG. 8 is a longitudinal cross-sectional view of the support member part of FIG. 7A cut perpendicular to the shaft.

FIGS. 7A and 7B and FIG. 8 show still another embodiment of the present invention. The present embodiment differs from the embodiment shown in FIGS. 5A and 5B and FIG. 6 in the point that the tubular member 3 is split into two and is formed by a pair of split members 3A, 3B with semicircular cross-sections. Note that in the present embodiment, the outside member 1 is a connecting rod, the bearing 8 is white metal, the shaft 4 is a crankshaft, and 9 indicates a piston.

In the present embodiment, the outside member 1, tubular member 3, and bearing 8 are split into two. The outside member 1 is split into two at its big end part. Inside the recesses 2A, 2B with the semicircular cross-sections of the split parts 1A, 1B, split members 3A, 3B with semicircular cross-sections are fastened. The split bearings 8A, 8B are fit into these, then the split parts 1A, 1B are fastened by fasteners 10. At the outer circumferential surfaces 5A, 5B of the semicircular cross-section split members 3A, 3B, a plurality of projections 6 the same as the tubular member 3 shown in the above embodiments are formed across the entire area. They are insert cast at the split parts 1A, 1B of the big end of the outside member 1.

Figure 9A:
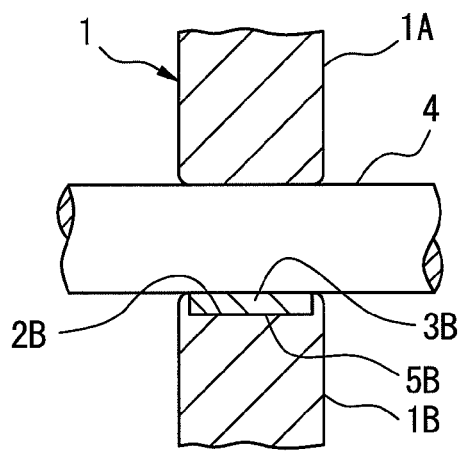
Figure 9B:
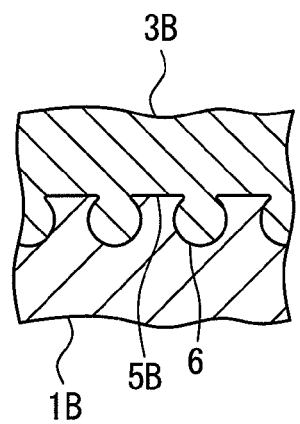
Figure 10:
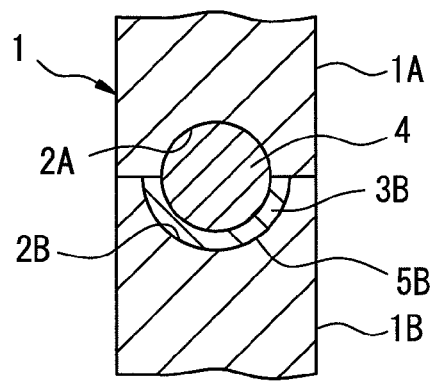
FIG. 10 is a longitudinal cross-sectional view of the support member part of FIG. 9A cut perpendicular to the shaft.

FIGS. 9A and 9B and FIG. 10 show still another embodiment of the present invention. The present embodiment differs from the first embodiment in the point that the support member is a single split member with a semicircular cross-section.

In the present embodiment, the outside member 1 is split into two. At the joining surface of one split part 1B of the outside member 1, a recess 2B with a semicircular cross-section is formed. Inside this recess 2B, a split member 3B with a semicircular cross-section is insert cast. The outer circumferential surface 5B of the split member 3B has formed over its entire surface a plurality of projections 6 the same as the tubular member 3 shown in the above embodiments. The joining surface of the other split part 1A is also formed with a recess 2A with a semicircular cross-section. A shaft 4 is supported rotatably inside the support hole formed by this recess 2A and split member 3B.

Figure 11A:
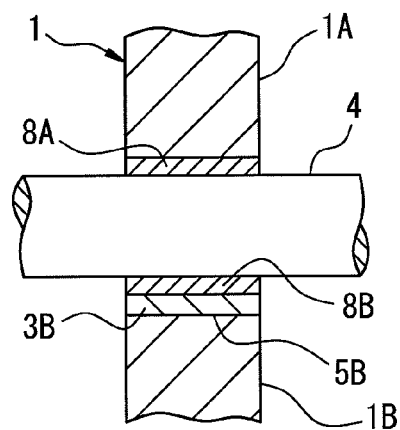
Figure 11B:
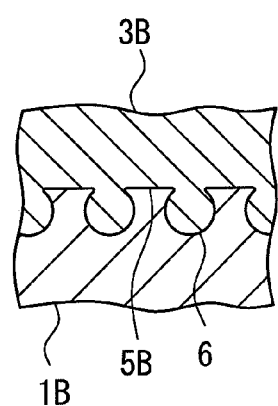
Figure 12:
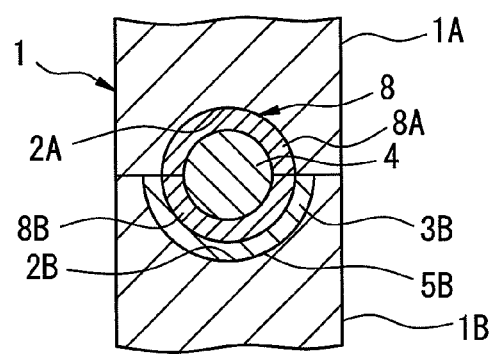
FIG. 12 is a longitudinal cross-sectional view of the support member part of FIG. 11A cut perpendicular to the shaft.

FIGS. 11A and 11B and FIG. 12 show still another embodiment of the present invention. The present embodiment differs from the embodiment shown in FIGS. 9A and 9B and FIG. 10 in the point that the support member supports the shaft through a bearing.

That is, in the present embodiment, in the recess 2B of the joining surface of one split part 1B of the outside member 1, the semicircular cross-section split member 3B is insert cast. Further, at the split member 3B, the split bearing 8B is attached. In the recess 2A of the joining surface of the other split member 1A, the split bearing 8A is attached. The shaft 4 is rotatably supported through the bearing 8 comprised of the pair of split bearings 8A, 8B.

The material of the outside member is not limited to a metal and is sometimes also a plastic or rubber. At this time, the tubular member 3 or the split members 3A, 3B are for example attached to the outside member by injection molding.

In the above embodiments, a metal support member was shown, but a plastic support member is also possible. The plastic support member is configured the same as the metal support member shown in the above embodiments. A plastic support member is for example produced by injection molding. That is, on the inner surface of the mold, a mold wash layer having a plurality of projection shaped recesses is formed. Plastic is injection molded into this mold. After the plastic hardens and the support member is formed, the support member is taken out from the mold together with the mold wash layer. This is then blasted to remove the mold wash whereby a plastic support member which has a plurality of projections, at least part of which projections have a thin-waisted shape, over its entire outer circumferential surface is produced. The plastic support member is, for example, attached in a plastic or rubber outside member by injection molding.

While the invention has been described with reference to specific embodiments chosen for purpose of illustration, it should be apparent that numerous modifications could be made thereto by those skilled in the art without departing from the basic concept and scope of the invention.

The invention claimed is:

1. A metal support member which supports a rotary member directly or through a bearing and which has a plurality of projections at its outer circumferential surface, wherein said plurality of the projections are formed at the outer circumferential surface as a whole at the time of casting of the support member and said support member is formed by a pair of split members with semicircular cross-sections, and wherein at least part of the projections have a first part that is distal to the outer circumferential surface and a second part that is proximal to the outer circumferential surface, the first part having a first thickness and the second part having a second thickness, the second thickness less than the first thickness, and wherein at least part of the projections are substantially spherical projections connected to the outer circumferential surface, the spherical projections randomly positioned on the outer circumferential surface.

2. The metal support member as set forth in claim 1 wherein the height of the projections is 0.3 to 2.0 mm, while the number of the projections is 5 to 100/cm2.

3. The metal support member as set forth in claim 1, wherein said support member is made of cast iron, cast steel, copper, copper alloy, aluminum alloy, or magnesium alloy.

4. The metal support member as set forth in claim 1, wherein said metal support member is attached by being cast in a member made of aluminum alloy, or magnesium alloy.

5. The metal support member as set forth in claim 1, which is attached by integral molding in a member made of plastic or rubber.

\* \* \* \* \*